Feb. 17, 1970 C. I. BOKSJO ET AL 3,496,445

THYRISTOR HELICAL STACK EMPLOYING COOLING VOLTAGE DIVIDERS AND CONTROL MEANS THEREFOR

Filed Sept. 28, 1967

INVENTORS
CARL INGVAR BOKSJO
ERNST INGVAR LORE
BY
Jennings Bailey, Jr

United States Patent Office 3,496,445
Patented Feb. 17, 1970

3,496,445

THYRISTOR HELICAL STACK EMPLOYING COOLING, VOLTAGE DIVIDERS AND CONTROL MEANS THEREFOR

Carl Ingvar Boksjo and Ernst Ingvar Lore, Ludvika, Sweden, assignors to Allmänna Svenska Elektriska Aktiebolaget, Vasteras, Sweden, a corporation of Sweden Filed Sept. 28, 1967, Ser. No. 671,350
Claims priority, application Sweden, Oct. 11, 1966, 13,745/66
Int. Cl. H02m 7/00
U.S. Cl. 321—8 3 Claims

ABSTRACT OF THE DISCLOSURE

A rectifier stack wherein thyristors are arranged in groups of four at story levels determined by the separate turns of a vertical helix. Each thyristor has a cooling device carried by a central channel. Each thyristor has a voltage divider positioned on one of its sides and a control device on its other side.

BACKGROUND OF THE INVENTION

Field of the invention

The present invention relates to a static converter valve having a number of thyristors connected in series in a substantially vertical helical arrangement forming a number of stories, at least four thyristors with cooling elements along with voltage dividers and controls for turning on and off the thyristors being located substantially on each story level.

The prior art

However, if in such an arrangement the voltage dividers for one thing and for another the controls are placed outside of the thyristor helix itself, the construction of the valve is complicated, and the valve will also be sensitive to disturbing influences and difficult to repair, should any defects arise.

SUMMARY OF THE INVENTION

Such inconveniences will be avoided if according to the invention the voltage dividers and the controls are arranged in pairs with each thyristor and the respective cooling elements on a common partition line between two adjacent sectors of the substantially circular helix cross section on the thyristor side facing the centre of said circle, and further the voltage dividers and controls, each one in its separate location, are positioned in two adjacent sectors on opposite sides of the common partition line.

In certain cases it may be convenient to fix the cooling elements of the thyristors to the walls of a channel for coolant supply, and further the current bars for the connection in series of the thyristors may be used as a supporting means for the voltage dividers and controls, respectively. Such auxiliary equipment of the thyristors as voltage dividers, controls and the like, are thus located substantially on the same story level as and immediately adjacent to the thyristors and their cooling elements. By the arrangement of the valve in this way it will be mechanically rigid, and its components can be electrically interconnected by short conductors. Moreover, it will be easy to make measurements on the valve, and maintenance and possible repair of the same are greatly facilitated.

BRIEF DESCRIPTION OF THE DRAWINGS

The invention is disclosed more in detail below by way of describing an example of the same with reference to the accompanying drawing in which.

DESCRIPTION OF THE PREFERRED EMBODIMENTS

Figure 1:
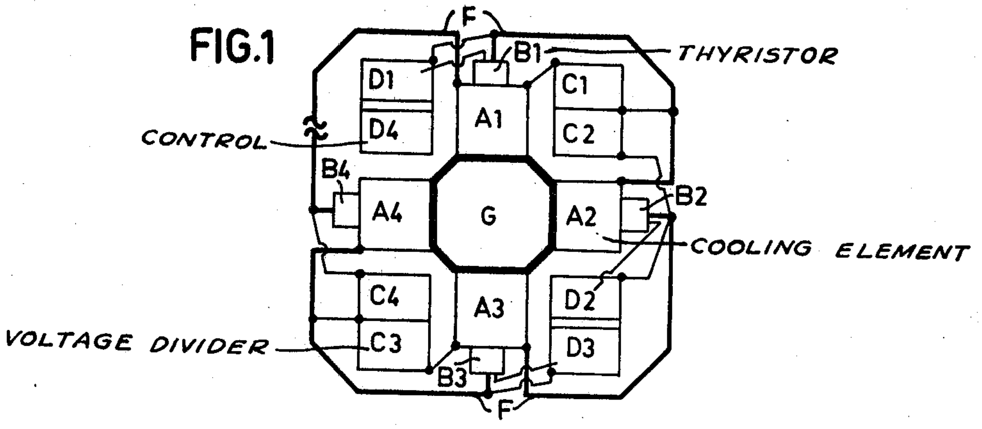
FIG. 1 schematically illustrates the static converter valve viewed from above.

In FIG. 1 four thyristors B1 to B4 are arranged in the same helical turn or, using another expression, on the same story level, diametrically opposed along the helix periphery, that is each one on the common partition line of two adjacent quadrants. It is of course possible to arrange more than four thyristors at the same level, but in such a case the set-up will get more complicated. Inside each thyristor B1 to B4 towards the centre of the circular helix is one of the cooling elements A1 to A4, which in the present case are supported by a central channel G. Said channel may for example serve the purpose of a transportation duct for a coolant, but it can naturally also serve other purposes. In the mechanical disposition of the valve according to the invention the thyristors form groups of pairs. Thus, by way of example, voltage dividers C1, C2 cooperate with thyristor pair B1, B2, while controls D2, D3 cooperate with thyristor pair B2, B3. The four voltage dividers C1 to C4 are therefore positioned by twos relative to each other in opposing quadrants in order for each one to serve its adjacent thyristor B1, B2, B3 or B4. The four controls D1 to D4 are positioned by twos in the two other opposing quadrants. According to the drawing control D4 will be located on the story level above or below the level of control D1, while the control located on the same level as D1 can be indicated by D0 serving a thyristor B0 according to the diagram of FIG. 2. Current bars F are used as supporting elements for the voltage dividers, said bars being necessary for the connection in series of the thyristors. As is evident the construction according to the present invention will be very compact, and the control circuits are protected from outside interference, while the wiring at the same time will be simple and easy to inspect. It will also be simple to energize the controls and to supply control pulses through axial conductors incorporated in the static converter valve, which conductors pass through a free space within each quadrant.

Figure 2:
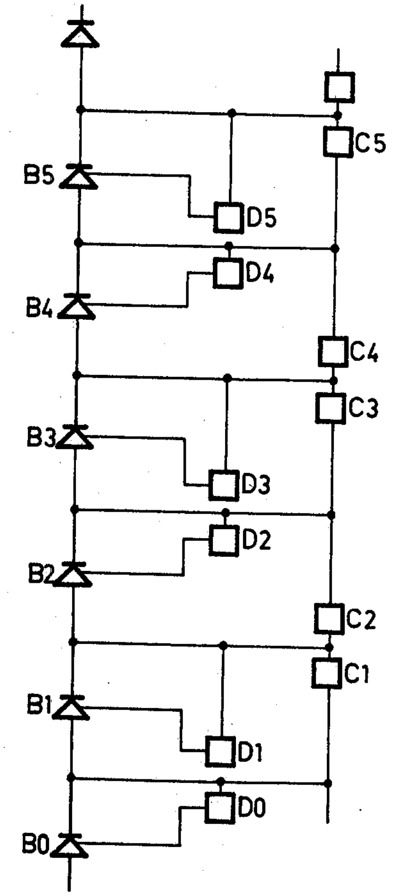
FIG. 2 shows the corresponding electrical circuit diagram.

FIG. 2 illustrates a circuit diagram of the arrangement according to the invention, in which diagram, in addition to the parts already mentioned above, also thyristors B0 and B5 are included together with the corresponding voltage divider C5 and controls D0, D5 in order to illustrate the interaction in pairs of the thyristors.

What we claim is:

1. A static current converter valve including a number of thyristors connected in series, said thyristors being positioned in a substantially vertical helical arrangement forming a number of stories, at least four thyristors with cooling elements and related voltage dividers and controls for turning on and off the thyristors being located on substantially the same story level, characterized in that the voltage dividers and controls respectively are arranged in pairs with each thyristor on a common partition line between two adjacent sectors of the substantially circular helix cross section with related cooling elements on the thyristor side facing the centre of said circle, and the voltage dividers and controls each one in its separate location are positioned in two adjacent sectors on opposing sides of the common partition line.

2. A valve according to claim 1, characterized in that the cooling elements are supported by the walls of a channel for transportation of a fluid.

3. A valve according to claim 1, characterized by current bars for connection in series of the thyristors, said current bars forming supporting elements for the voltage dividers and the controls.

References Cited

UNITED STATES PATENTS

| | | | |
|---|---|---|---|
| 3,234,451 | 2/1966 | Diebold | 321—8 |
| 3,398,349 | 8/1968 | Evans et al. | 321—27 X |

| | | | |
|---|---|---|---|
| 3,405,344 | 10/1968 | Boksjo et al. | 321—11 |

J. D. TRAMMELL, Primary Examiner

G. GOLDBERG, Assistant Examiner

U.S. Cl. X.R.

317—100; 321—11